United States Patent
Song et al.

(10) Patent No.: US 11,258,291 B2
(45) Date of Patent: Feb. 22, 2022

(54) POWER SUPPLY CIRCUIT FOR ENERGY TRANSFER BETWEEN BATTERY AND SMOOTHING CAPACITOR, BATTERY MANAGEMENT SYSTEM AND BATTERY PACK

(71) Applicant: LG ENERGY SOLUTION, LTD., Seoul (KR)

(72) Inventors: Hyeon-Jin Song, Daejeon (KR); Seon-Uk Yu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 124 days.

(21) Appl. No.: 16/623,307

(22) PCT Filed: Jan. 28, 2019

(86) PCT No.: PCT/KR2019/001181
§ 371 (c)(1),
(2) Date: Dec. 16, 2019

(87) PCT Pub. No.: WO2019/160257
PCT Pub. Date: Aug. 22, 2019

(65) Prior Publication Data
US 2020/0185954 A1 Jun. 11, 2020

(30) Foreign Application Priority Data
Feb. 14, 2018 (KR) .......................... 10-2018-0018598

(51) Int. Cl.
*H02J 7/00* (2006.01)
*H02J 7/34* (2006.01)
*H02P 27/06* (2006.01)

(52) U.S. Cl.
CPC ............. *H02J 7/345* (2013.01); *H02J 7/0029* (2013.01); *H02J 2207/20* (2020.01); *H02P 27/06* (2013.01)

(58) Field of Classification Search
USPC .......................... 320/126, 127, 128, 129, 130
See application file for complete search history.

(56) References Cited

U.S. PATENT DOCUMENTS 4,127,782 A * 11/1978 Omura ................ B60R 16/0307
307/10.1
6,362,979 B1 3/2002 Gucyski
(Continued)

FOREIGN PATENT DOCUMENTS

CN 101712284 A 5/2010
DE 102016007000 A1 2/2017
(Continued)

OTHER PUBLICATIONS

Extended European Search Report dated Jun. 25, 2020 for Application No. 19754991.8.
(Continued)

*Primary Examiner* — Brian Ngo
(74) *Attorney, Agent, or Firm* — Birch, Stewart, Kolasch & Birch, LLP

(57) ABSTRACT

Provided is a power supply circuit for energy transfer between a battery and a smoothing capacitor, a battery management system and a battery pack. The power supply circuit includes a transformer including a first winding and a second winding, a first switching circuit including a first switch connected in series to the first winding, and connected in parallel to the battery together with the first winding, a second switching circuit including a second switch connected in series to the second winding, and connected in parallel to the smoothing capacitor together with the second winding, and a switch controller. To pre- (Continued)

charge the smoothing capacitor, the switch controller is configured to perform a first operation of turning on the first switch and turning off the second switch, and subsequently perform a second operation of turning off the first switch and turning on the second switch.

13 Claims, 16 Drawing Sheets

(56) References Cited

U.S. PATENT DOCUMENTS

| | | | |
|---|---|---|---|
| 9,042,146 | B2 | 5/2015 | Weiss et al. |
| 2003/0029654 | A1* | 2/2003 | Shimane ................ B60L 50/16 180/65.29 |
| 2005/0047175 | A1 | 3/2005 | Kawasaki et al. |
| 2005/0233192 | A1 | 10/2005 | Ishikawa et al. |
| 2010/0078997 | A1 | 4/2010 | Chen et al. |
| 2012/0206103 | A1* | 8/2012 | Butzmann ............... B60L 58/21 320/126 |
| 2013/0066519 | A1 | 3/2013 | Yoshikawa et al. |
| 2014/0210417 | A1* | 7/2014 | Kim .................. H02J 7/007192 320/130 |
| 2014/0354212 | A1 | 12/2014 | Sugeno et al. |
| 2015/0155732 | A1 | 6/2015 | McCormick |
| 2015/0231976 | A1 | 8/2015 | Byun et al. |
| 2015/0258901 | A1 | 9/2015 | Min |
| 2016/0144725 | A1 | 5/2016 | Nozawa |
| 2017/0110975 | A1 | 4/2017 | Nishi et al. |
| 2017/0113567 | A1 | 4/2017 | Koketsu et al. |
| 2017/0373520 | A1 | 12/2017 | Sugeno et al. |

FOREIGN PATENT DOCUMENTS

| | | | | |
|---|---|---|---|---|
| EP | 2506388 | A2 | | 10/2012 |
| JP | 2002-125325 | A | | 4/2002 |
| JP | 2004304970 | A | * | 10/2004 |
| JP | 2007-318849 | A | | 12/2007 |
| JP | 2009-240097 | A | | 10/2009 |
| JP | 2012-213291 | A | | 11/2012 |
| JP | 2013-62980 | A | | 4/2013 |
| JP | 2013-103557 | A | | 5/2013 |
| JP | 2013-135486 | A | | 7/2013 |
| JP | 2015-23663 | A | | 2/2015 |
| JP | 2015056997 | A | * | 3/2015 |
| JP | 2015-107045 | A | | 6/2015 |
| JP | 2015104298 | A | * | 6/2015 |
| JP | 2016-59084 | A | | 4/2016 |
| JP | 2016-140159 | A | | 8/2016 |
| JP | 2016-167937 | A | | 9/2016 |
| JP | 2016-167955 | A | | 9/2016 |
| JP | 2017-28773 | A | | 2/2017 |
| JP | 2017-30408 | A | | 2/2017 |
| JP | 2017030408 | A | * | 2/2017 |
| JP | 2017-85869 | A | | 5/2017 |
| KR | 10-2013-0069001 | A | | 6/2013 |
| KR | 10-2015-0063951 | A | | 6/2015 |
| KR | 10-2015-0096919 | A | | 8/2015 |
| KR | 10-1551068 | B1 | | 9/2015 |
| KR | 10-2015-01115281 | A | | 10/2015 |
| KR | 10-1696315 | B1 | | 1/2017 |
| WO | WO 2004/055929 | A1 | | 7/2004 |
| WO | WO-2005053141 | A1 | * | 6/2005 ............. H01F 27/38 |
| WO | WO 2016/132414 | A1 | | 8/2016 |

OTHER PUBLICATIONS

International Search Report for PCT/KR2019/001181 (PCT/ISA/210) dated May 14, 2019.

* cited by examiner

POWER SUPPLY CIRCUIT FOR ENERGY TRANSFER BETWEEN BATTERY AND SMOOTHING CAPACITOR, BATTERY MANAGEMENT SYSTEM AND BATTERY PACK

TECHNICAL FIELD

The present disclosure relates to a power supply circuit for energy transfer between a battery and a smoothing capacitor, and more particularly, to a power supply circuit that selectively performs an operation of pre-charging a smoothing capacitor by using energy of a battery and an operation of charging the battery by using energy of the smoothing capacitor.

The present application claims priority to Korean Patent Application No. 10-2018-0018598 filed in the Republic of Korea on Feb. 14, 2018, the disclosure of which is incorporated herein by reference.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages of pre-charging and discharging, a very low self-discharge rate and high energy density.

In general, electrical connection between a battery and an electrical load is controlled by a main contactor, and the electrical load is provided with a smoothing capacitor connected in parallel to the battery through the main contactor. The smoothing capacitor suppresses noise included in the DC power supplied form the battery.

However, if the main contactor is turned on when a difference between the voltage of the battery and the voltage of the smoothing capacitor is very large, a very high current instantaneously flows through the main contactor, and accordingly the main contactor may be damaged. To solve this problem, Patent Literature 1 discloses a pre-charge circuit. The pre-charge circuit is a series circuit including a pre-charge resistor and a pre-charge contactor, and is connected in parallel to the main contactor. Before the main contactor is turned on, the pre-charge contactor is turned on, and accordingly the smoothing capacitor is pre-charged by the discharge current from the battery, and the voltage difference between the battery and the electrical load reduces below the allowable level.

However, the conventional pre-charge circuit has some drawbacks as below. The first drawback is that when the smoothing capacitor is pre-charged a very large number of times in a short time, the temperature of the pre-charge resistor significantly increases. Overheat of the pre-charge resistor may degrade the performance of the pre-charge resistor itself as well as peripheral circuit components. The second drawback is that electrical energy stored in the smoothing capacitor through pre-charging could not be used to charge the battery and is wasted.

(Patent Literature 1) Korean Patent Publication No. 10-2015-0063951 (published Jun. 10, 2015)

DISCLOSURE

Technical Problem

The present disclosure is designed to solve the above-described problem, and therefore the present disclosure is directed to providing a power supply circuit for pre-charging a smoothing capacitor using energy of a battery in a state of insulation between the battery and the smoothing capacitor, a battery management system and a battery pack.

The present disclosure is further directed to providing a power supply circuit for charging a battery using energy of a smoothing capacitor in a state of insulation between the battery and the smoothing capacitor, a battery management system and a battery pack These and other objects and advantages of the present disclosure can be understood by the following description and will be apparent from the embodiments of the present disclosure. Further, it will be readily understood that the objects and advantages of the present disclosure can be realized by the means set forth in the appended claims and combinations thereof.

Technical Solution

A power supply circuit for energy transfer between a battery and a smoothing capacitor according to an aspect of the present disclosure includes a transformer including a first winding and a second winding magnetically coupled to the first winding, a first switching circuit including a first switch connected in series to the first winding, wherein the first switching circuit is connected in parallel to the battery together with the first winding, a second switching circuit including a second switch connected in series to the second winding, wherein the second switching circuit is connected in parallel to the smoothing capacitor together with the second winding, and a switch controller configured to independently control each switch included in the first switching circuit and the second switching circuit. The switch controller is configured to perform, in a first control mode for pre-charging the smoothing capacitor using energy of the battery, a first operation of turning on the first switch and turning off the second switch, and subsequently perform a second operation of turning off the first switch and turning on the second switch.

A ratio of the number of turns of the second winding to the number of turns of the first winding may be larger than 0 and equal to or less than 1.

The switch controller may be configured to perform, in a second control mode for charging the battery using energy of the smoothing capacitor, a third operation of turning off the first switch and turning on the second switch, and subsequently perform a fourth operation of turning on the first switch and turning off the second switch.

The transformer further includes a third winding connected in series to the first winding. The third winding may be magnetically coupled to the second winding.

The first switching circuit may further include a third switch connected in series to the third winding, and a fourth switch connected in parallel to the third winding and the third switch.

A ratio of the number of turns of the second winding to the number of turns of the third winding may be larger than 0 and equal to or less than 1.

The switch controller may turn off the third switch and turn on the fourth switch while performing the first operation. The switch controller may be configured to turn off the third switch and turn off the fourth switch while performing the second operation.

The switch controller may turn off the third switch and turn off the fourth switch while performing the third operation. The switch controller may be configured to turn on the third switch and turn off the fourth switch while performing the fourth operation.

The transformer further includes a fourth winding connected in series to the second winding. The fourth winding may be magnetically coupled to the first winding. The second switching circuit may further include a fifth switch connected in series to the fourth winding, and a sixth switch connected in parallel to the fourth winding and the fifth switch.

The switch controller may be configured to turn off the fifth switch and turn off the sixth switch while performing the first operation. The switch controller may be configured to turn on the fifth switch and turn off the sixth switch when performing the second operation.

The switch controller may be configured to turn off the fifth switch and turn on the sixth switch while performing the third operation. The switch controller may be configured to turn off the fifth switch and turn off the sixth switch while performing the fourth operation.

Each switch included in the first switching circuit and the second switching circuit may be a field effect transistor.

A battery management system according to another aspect of the present disclosure includes the power supply circuit.

A battery pack according to still another aspect of the present disclosure includes the battery management system.

Advantageous Effects

According to at least one of the embodiments of the present disclosure, it is possible to pre-charge a smoothing capacitor using energy of a battery in a state of insulation between the battery and the smoothing capacitor.

Additionally, according to at least one of the embodiments of the present disclosure, it is possible to charge a battery using energy of a smoothing capacitor in a state of insulation between the battery and the smoothing capacitor.

The effects of the present disclosure are not limited to the effects mentioned above, and these and other effects will be clearly understood by those skilled in the art from the appended claims.

BRIEF DESCRIPTION OF DRAWINGS

The accompanying drawings illustrate a preferred embodiment of the present disclosure, and together with the following detailed description of the present disclosure, serve to provide a further understanding of the technical aspects of the present disclosure, and thus the present disclosure should not be construed as limited to the drawings.

MODE FOR DISCLOSURE

Figure 1:
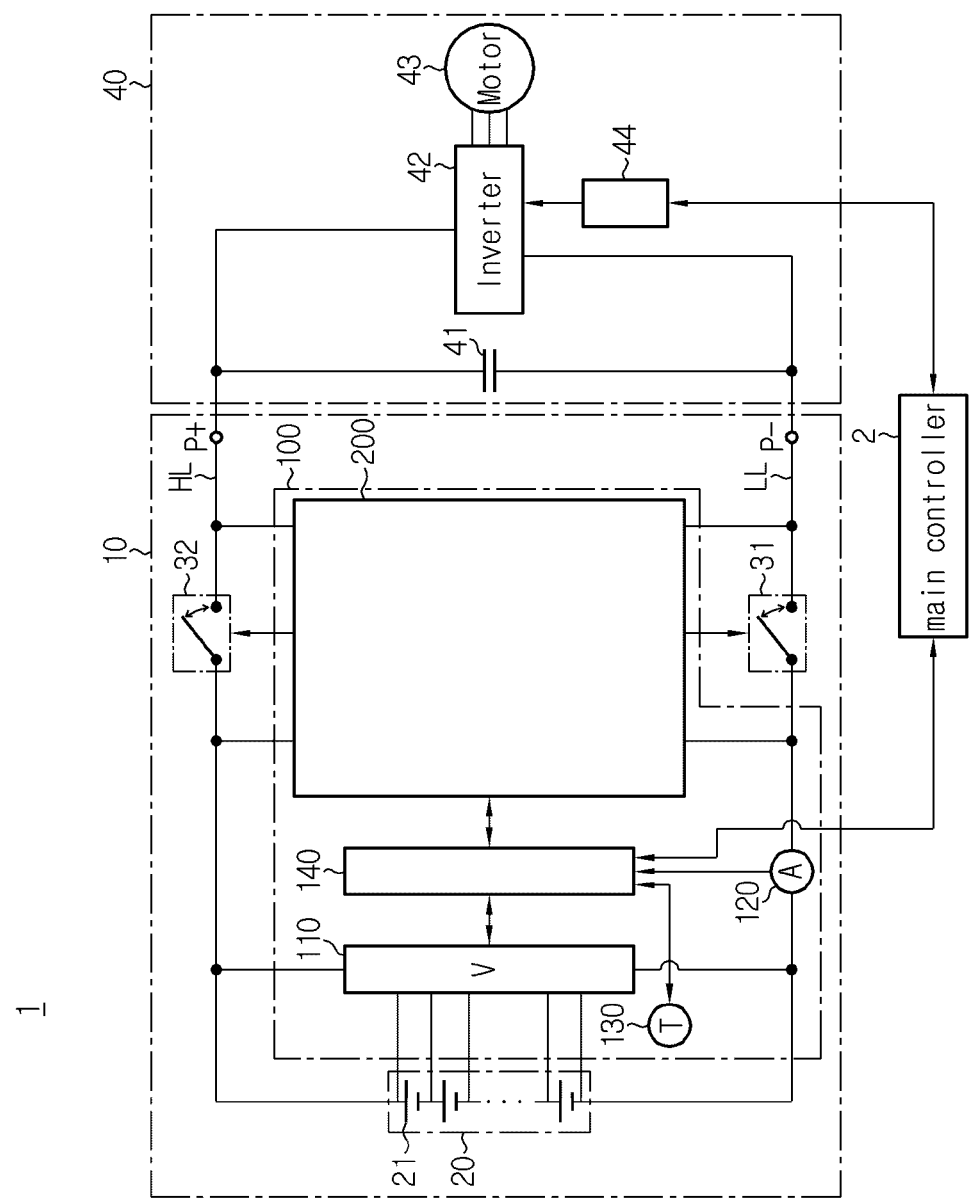
FIG. 1 is a diagram exemplarily showing the configuration of an electrical apparatus according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein.

The terms including the ordinal number such as "first", "second" and the like, are used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

FIG. 1 is a diagram exemplarily showing the configuration of an electrical apparatus according to an embodiment of the present disclosure.

Referring to FIG. 1, the electrical apparatus 1 includes a main controller 2, a battery pack 10 and an electrical load 40. For example, the electrical apparatus 1 may be an electric vehicle, and in this case, the main controller 2 may be referred to as a vehicle controller. A motor controller 44 and a switch controller 500 as described below may operate in response to a command from the main controller 2. The motor controller 44, the switch controller 500 and the main controller 2 may communicate with one another, for example, via a controller area network (CAN). Each of the motor controller 44 and the switch controller 500 may be activated in response to a wakeup command from the main controller 2.

The electrical load 40 is configured to receive DC power from the battery pack 10 or supply DC power to the battery pack 10. The electrical load 40 may include a smoothing capacitor 41, an inverter 42, a motor 43 and the motor controller 44. The smoothing capacitor 41 is connected in parallel between a first pack terminal P+ and a second pack terminal P− of the battery pack 10 to suppress a rapid change in DC power. The inverter 42 converts the DC power supplied from the battery pack 10 to AC power and supplies the AC power to the motor 43. The motor 43 operates using the AC power supplied from the inverter 42.

The battery pack 10 includes a battery 20, a first main contactor 31 and a battery management system 100. The battery pack 10 may further include a second main contactor 32.

The battery 20 includes at least one battery cell 21. Each battery cell 21 may be, for example, a lithium ion battery 20. Of course, the type of the battery cell 21 is not limited to the lithium ion battery 20, and includes any type that can be recharged repeatedly without any particular limitation. When the battery 20 includes a plurality of battery cells 21, the plurality of battery cells 21 may be connected in series, or in series and in parallel.

The first main contactor 31 is installed on a low voltage line LL between the battery pack 10 and the electrical load 40. The second main contactor 32 is installed on a high voltage line HL between the battery pack 10 and the electrical load 40. Each of the first main contactor 31 and the second main contactor 32 may be a mono-stable type or a bis-table type. As shown, one end of the first main contactor 31 may be connected to a negative terminal of the battery 20, and the other end of the first main contactor 31 may be connected to the electrical load 40. One end of the second main contactor 32 may be connected to a positive terminal of the battery 20, and the other end of the second main contactor 32 may be connected to the electrical load 40. Each of the first main contactor 31 and the second main contactor 32 may be controlled into an open control state or a closed control state according to a switching signal outputted from the battery management system 100.

The battery management system 100 is operably coupled to the first main contactor 31, the second main contactor 32 and/or the main controller 2. The battery management system 100 includes a voltage measuring unit 110, a current measuring unit 120, a temperature measuring unit 130, a control unit 140 and a power supply circuit 200.

The voltage measuring unit 110 is configured to measure the terminal voltage of each battery cell 21 included in the battery 20. Additionally, the voltage measuring unit 110 may measure the terminal voltage of the battery 20. The voltage measuring unit 110 may transmit a voltage signal indicating the terminal voltage of the battery 20 and/or the terminal voltage of the battery cell 21 to the control unit 140 periodically or in response to a request from the control unit 140.

The current measuring unit 120 is installed on the high voltage line HL or the low voltage line LL of the battery pack 10 to measure the current flowing through the battery 20. The current measuring unit 120 may transmit a current signal indicating the current flowing through the battery 20 to the control unit 140 periodically or in response to a request from the control unit 140.

The temperature measuring unit 130 is configured to measure the temperature of the battery 20. The temperature measuring unit 130 may transmit a temperature signal indicating the temperature of the battery 20 to the control unit 140 periodically or in response to a request from the control unit 140.

The control unit 140 is operably coupled to the voltage measuring unit 110, the current measuring unit 120, the temperature measuring unit 130 and the main controller 2. The control unit 140 may be physically implemented using at least one of application specific integrated circuits (ASICs), digital signal processors (DSPs), digital signal processing devices (DSPDs), programmable logic devices (PLDs), field programmable gate arrays (FPGAs), microprocessors and electrical units for performing other performs. The control unit 140 may have a memory device embedded therein, and the memory device may include, for example, RAM. ROM, register, hard disk, an optical recording medium or a magnetic recording medium. The memory device may store, update and/or erase programs including various control logics that are executed by the switch controller 500, and/or data created when the control logics are executed.

The control unit 140 monitors the state (for example, State-of-Charge, State-of-Health, overcharge, overdischarge, overheat, etc.) of each battery cell 21 based on the voltage signal, the current signal and/or the temperature signal. Additionally, the control unit 140 may transmit a notification signal indicating the monitored state of each battery cell 21 to the main controller 2.

The control unit 140 transmits an operation start signal from the main controller 2 to the power supply circuit 200. For example, when a power button of the electrical apparatus 1 is pressed down, the main controller 2 may transmit the operation start signal to the control unit 140. Additionally, the control unit 140 transmits an operation stop signal from the main controller 2 to the power supply circuit 200. For example, when the power button of the electrical apparatus 1 is released, the main controller 2 may transmit the operation stop signal to the control unit 140.

The power supply circuit 200 is configured to execute a first control mode in response to the operation start signal. The power supply circuit may be configured to execute a second control mode in response to the operation stop signal. Hereinafter, the power supply circuit 200 according to the embodiments of the present disclosure will be described in more detail with reference to FIGS. 2 to 16.

Figure 2:
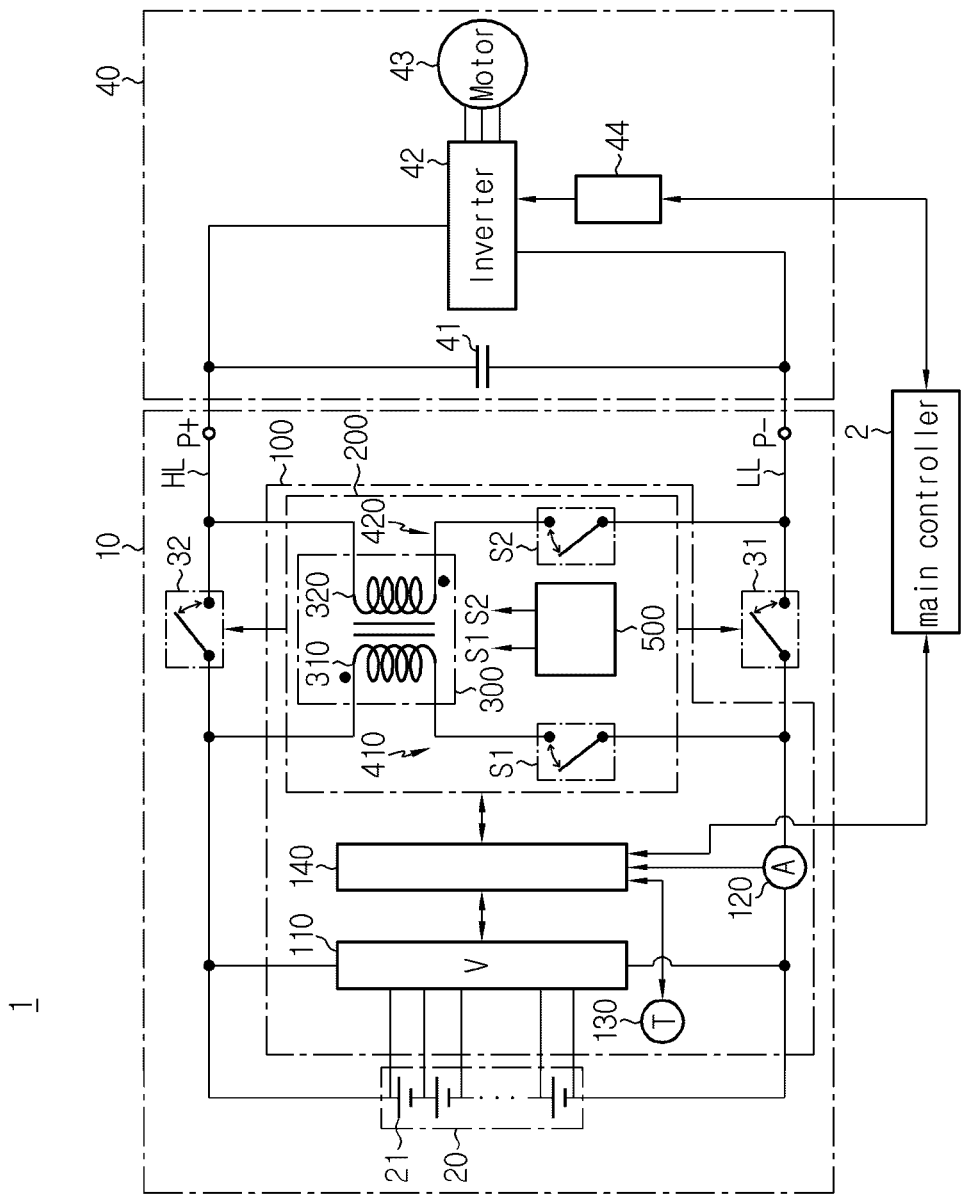
FIG. 2 is a diagram exemplarily showing the configuration of a power supply circuit according to an embodiment of the present disclosure.
Figure 3:
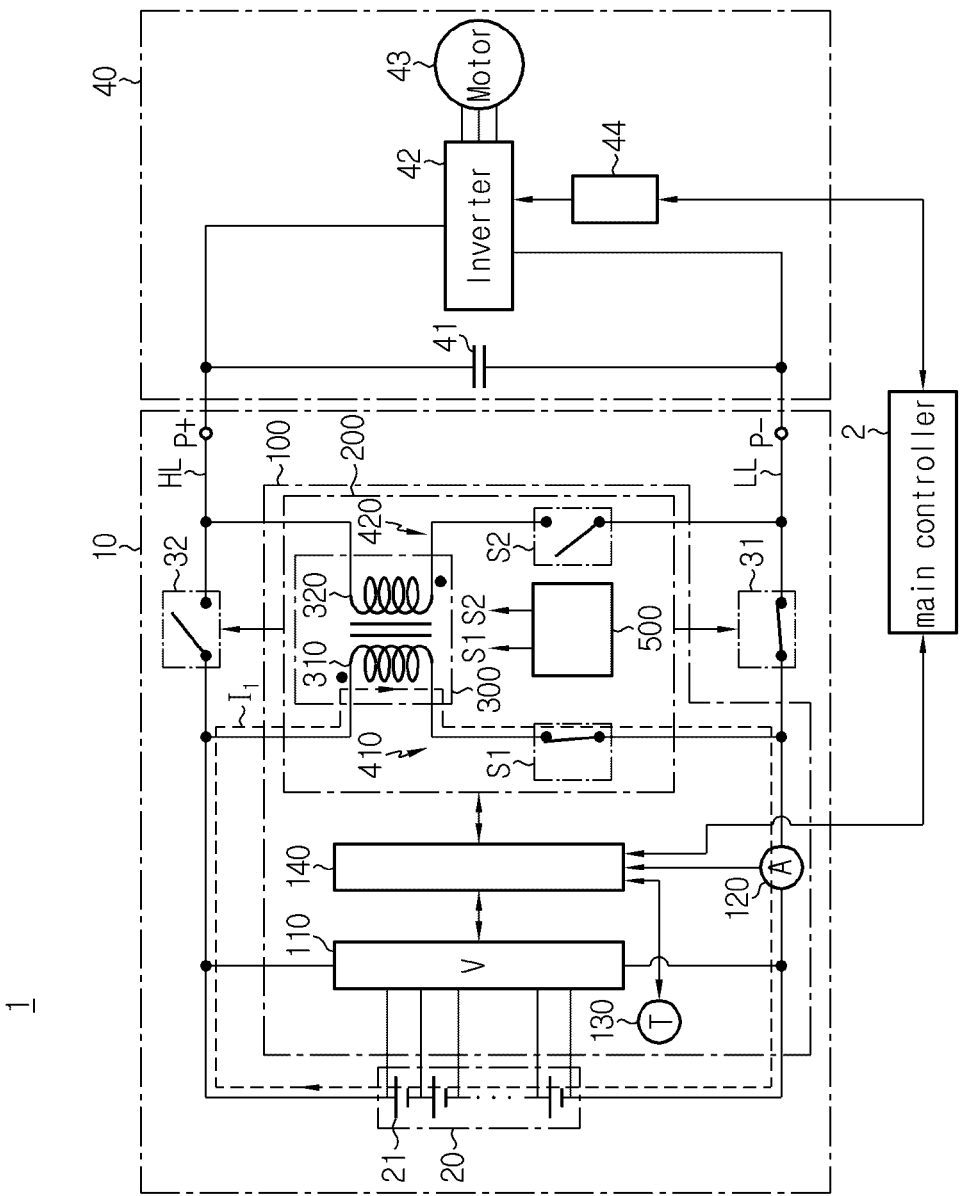
FIGS. 3 and 4 are diagrams for reference in describing a first operation and a second operation related to a first control mode in which the power supply circuit of FIG. 2 pre-charges a smoothing capacitor.
Figure 4:
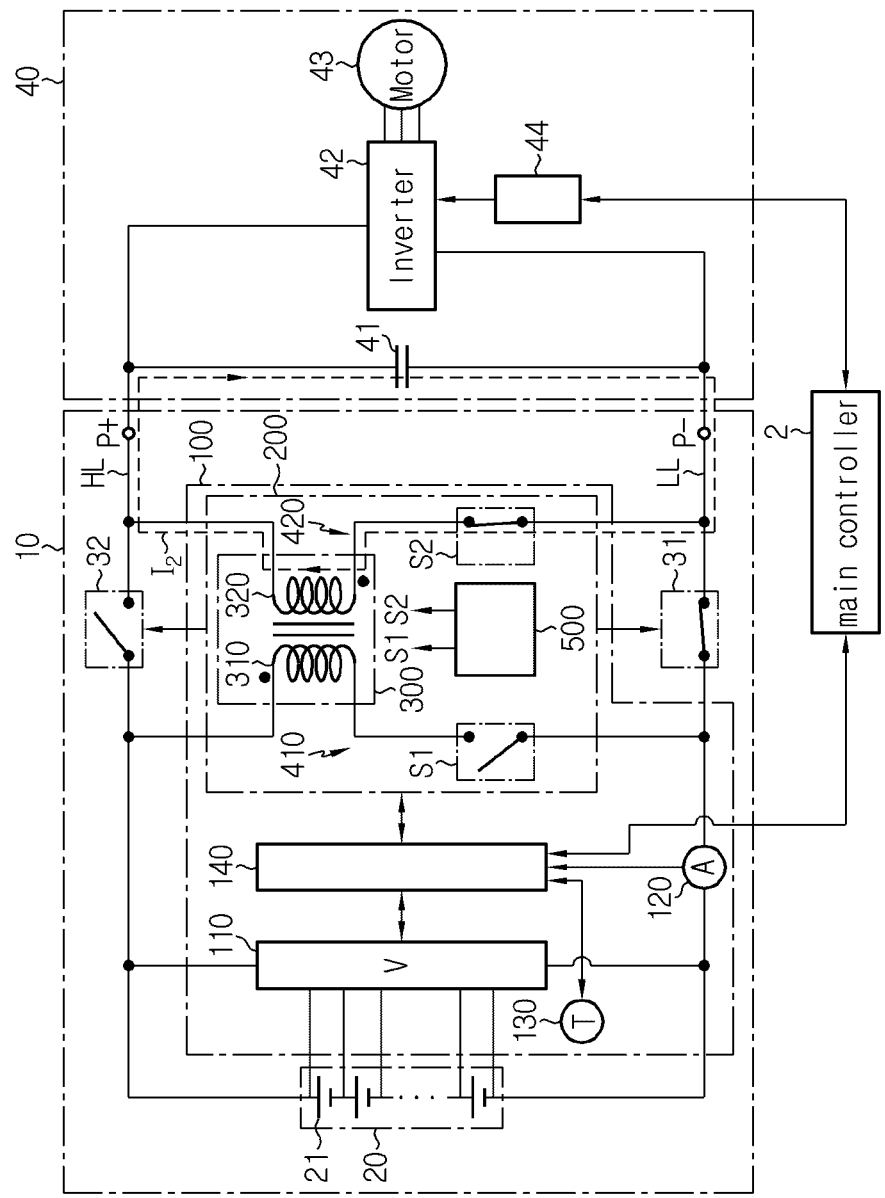
Figure 5:
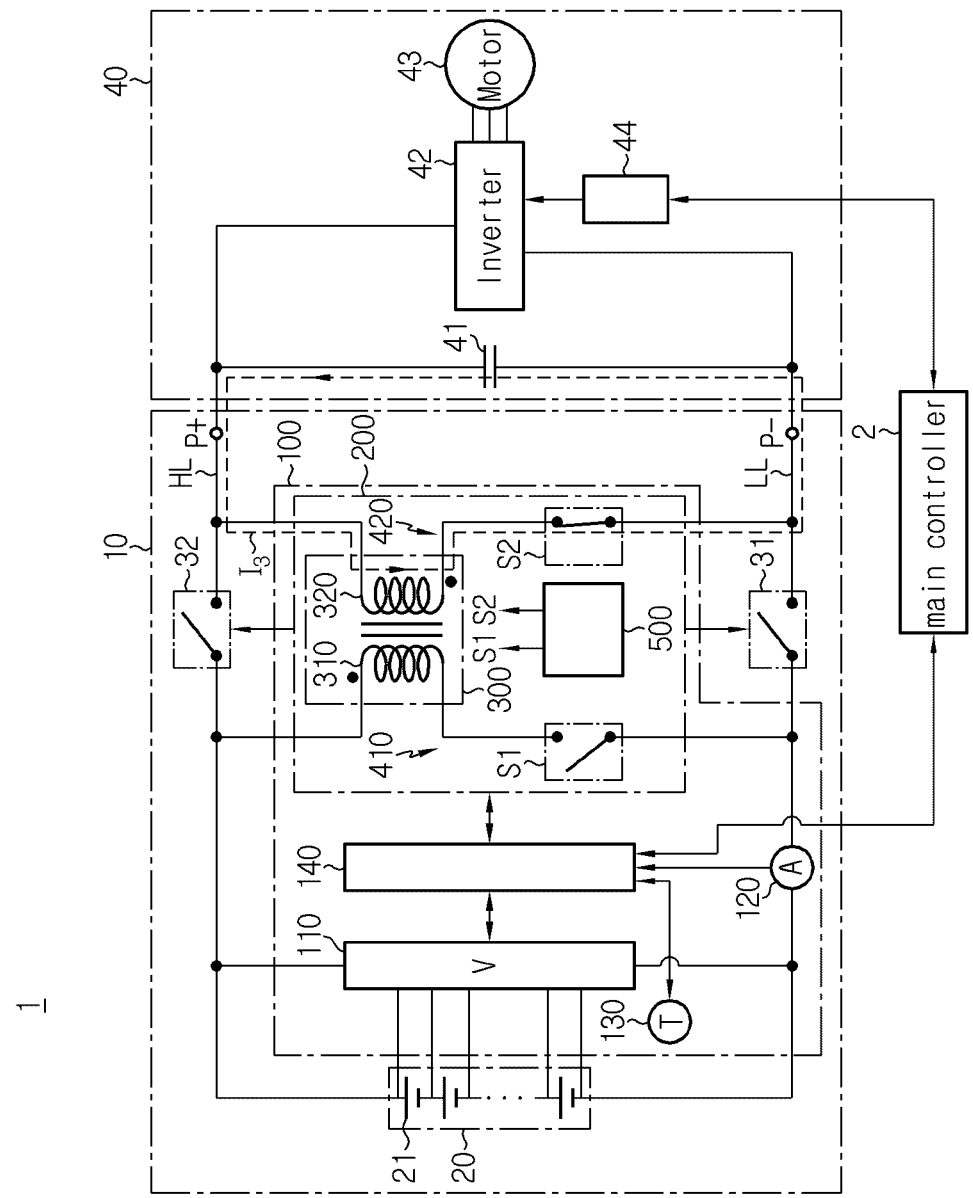
FIGS. 5 and 6 are diagrams for reference in describing a third operation and a fourth operation related to a second control mode in which the power supply circuit of FIG. 2 charges a battery.
Figure 6:
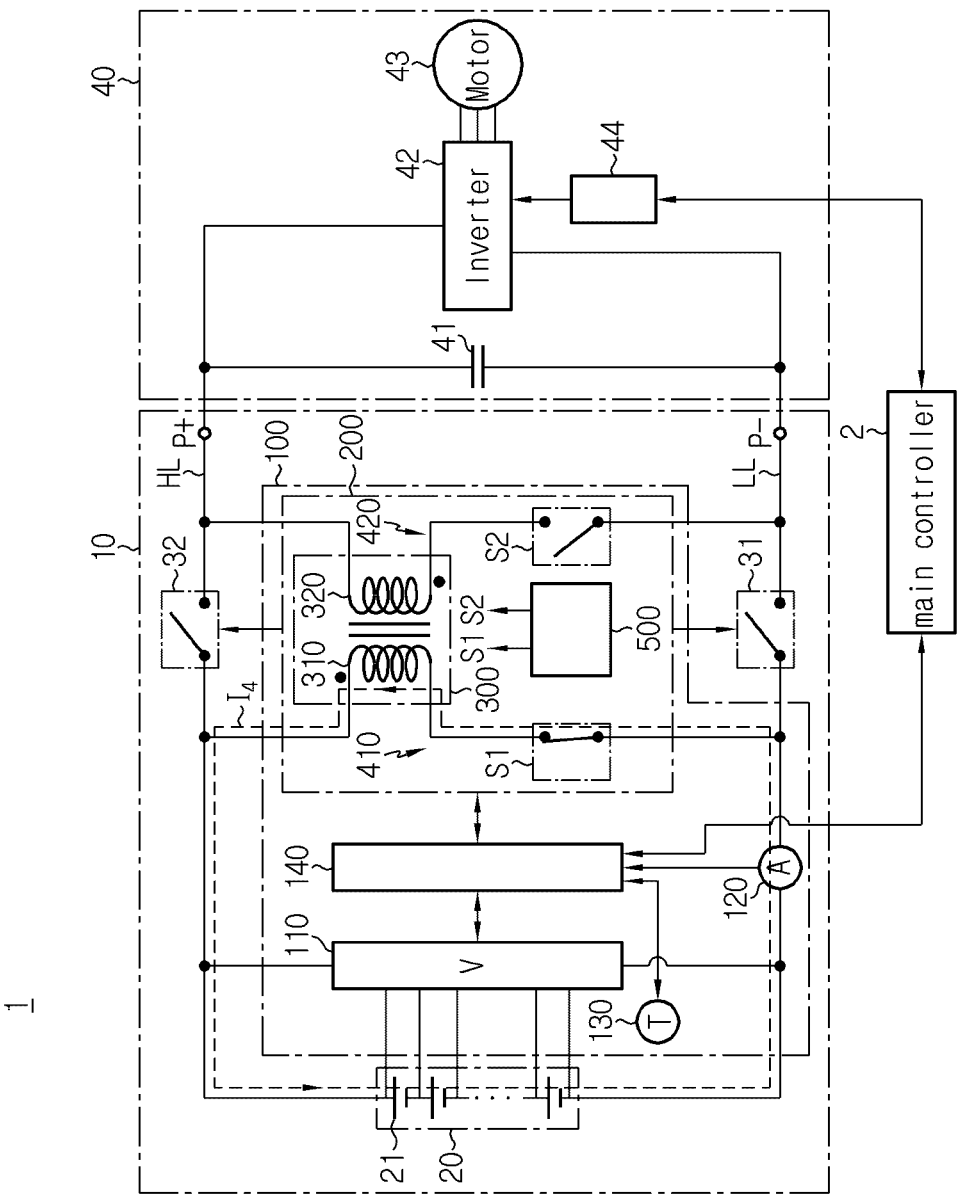

FIG. 2 is a diagram exemplarily showing the configuration of the power supply circuit according to an embodiment of the present disclosure, FIGS. 3 and 4 are diagrams for reference in describing a first operation and a second operation related to the first control mode in which the power supply circuit of FIG. 2 pre-charges the smoothing capacitor 41, and FIGS. 5 and 6 are diagrams for reference in describing a third operation and a fourth operation related to the second control mode in which the power supply circuit of FIG. 2 charges the battery 20.

Referring to FIG. 2, the power supply circuit 200 includes a transformer 300, a first switching circuit 410, a second switching circuit 420 and a switch controller 500.

The transformer 300 includes a first winding 310 and a second winding 320. The second winding 320 is magnetically coupled to the first winding 310. When energy is transferred from the first winding 310 to the second winding 320, the first winding 310 is a primary winding, and the second winding 320 is a secondary winding. On the contrary, when energy is transferred from the second winding 320 to the first winding 310, the second winding 320 is a primary winding, and the first winding 310 is a secondary winding. When the number of turns of the first winding 310 is a, the number of turns of the second winding 320 may be b. a:b=1:$N_1$ where $N_1$ may be larger than 0 and equal to or less than 1 (for example, 0.98).

The first switching circuit 410 includes a first switch S1. The first switch S1 is connected in series to the first winding 310. The first switching circuit 410 is connected in parallel to the battery 20. That is, the first switch 51 is connected in parallel to the battery 20 together with the first winding 310. When the first switch S1 is turned on, energy stored in the battery 20 is transferred to the first winding 310, or energy stored in the first winding 310 is transferred to the battery 20.

The second switching circuit 420 includes a second switch S2. The second switch S2 is connected in series to the second winding 320. The second switching circuit 420 is connected in parallel to the smoothing capacitor 41. That is, the second switch S2 is connected in parallel to the smoothing capacitor 41 together with the second winding 320. When the second switch S2 is turned on, energy stored in the second winding 320 is transferred to the smoothing capacitor 41, or energy stored in the smoothing capacitor 41 is transferred to the second winding 320.

The switch controller 500 is operably coupled to the voltage measuring unit 110, the current measuring unit 120, the first main contactor 31, the second main contactor 32, each switch included in the first switching circuit 410 and the second switching circuit 420 and/or the main controller 2. In the same way as the control unit 140, the switch controller 500 may be physically implemented using at least one of application specific integrated circuits (ASICs), digital signal processors (DSPs), digital signal processing devices (DSPDs), programmable logic devices (PLDs), field programmable gate arrays (FPGAs), microprocessors and electrical units for performing other functions.

The switch controller 500 is configured to independently control the first main contactor 31, the second main contactor 32 and each switch included in the first switching circuit 410 and the second switching circuit 420.

The switch controller 500 enters the first control mode in a state in which the first main contactor 31 is turned on and the second main contactor 32 is turned off in response to the operation start signal. The first control mode is a mode for pre-charging the smoothing capacitor 41 using energy of the battery 20. When the first control mode ends (i.e., when the smoothing capacitor 41 is pre-charged), the switch controller 500 turns on the second main contactor 32.

The switch controller 500 enters the second control mode after turning off at least one of the first main contactor 31 and the second main contactor 32 in response to the operation stop signal. The second control mode is a mode for charging the battery 20 using energy of the smoothing capacitor 41.

<First Control Mode>

In the first control mode, the switch controller 500 performs a first operation and a second operation in a sequential order. Referring to FIG. 3, the first operation is an operation of turning on the first switch S1 and turning off the second switch S2. When the first switch S1 is turned on, energy of the battery 20 is transferred to the first winding 310 while the discharge current $I_1$ from the battery 20 flows through the first switch S1 and the first winding 310. Accordingly, energy is accumulated in the first winding 310 from the start of the first operation until the second operation starts. Referring to FIG. 4, the second operation is an operation of turning off the first switch S1 and turning on the second switch S2. When the first switch S1 is turned off and the second switch S2 is turned on in a state in which energy is accumulated in the first winding 310 by the first operation, energy accumulated in the first winding 310 is transferred to the second winding 320 which is magnetically coupled to the first winding 310. Accordingly, the smoothing capacitor 41 is pre-charged while the gradually decreasing current $I_2$ flows through the second switch S2, the second winding 320 and the smoothing capacitor 41.

The first switch S1 and the second switch S2 may be a Field Effect Transistor (FET) that is turned on when a pulse signal (for example, a PWM signal) has the high state (for example, 3V) and is turned off when the pulse signal has the low state (for example, 0V). In the first control mode, the switch controller 500 may implement the first operation and the second operation by outputting a first pulse signal of a predetermined duty ratio to the first switch S1 and a second pulse signal having the opposite phase to the phase of the first pulse signal to the second switch S2. In the first control mode, the switching-on period of the first switch S1 is the switching-off period of the second switch S2, and the switching-off period of the first switch S1 is the switching-on period of the second switch S2. The first operation and the second operation may form a set, which may be repeated a predetermined number of times.

<Second Control Mode>

In the second control mode, the switch controller 500 performs a third operation and a fourth operation in a sequential order. Referring to FIG. 5, the third operation is an operation of turning off the first switch S1 and turning on the second switch S2. When the second switch S2 is turned on, energy of the smoothing capacitor 41 is transferred to the second winding 320 while the discharge current $I_3$ from the smoothing capacitor 41 flows through the second switch S2 and the second winding 320. Energy is accumulated in the second winding 320 from the start of the third operation until the fourth operation start.

Referring to FIG. 6, the fourth operation is an operation of turning off the second switch S2 and turning on the first switch S1. When the second switch S2 is turned off and the first switch S1 is turned on in a state in which energy is accumulated in the second winding 320, energy accumulated in the second winding 320 is transferred to the first winding 310 which is magnetically coupled to the second winding 320. Accordingly, the battery 20 is charged while the gradually decreasing current $I_4$ flows through the first switch S1, the first winding 310 and the battery 20.

In the second control mode, the switch controller 500 may implement the third operation and the fourth operation by outputting a third pulse signal of a predetermined duty ratio to the first switch S1 and a fourth pulse signal having the opposite phase to the phase of the third pulse signal to the second switch S2. In the second control mode, the switching-on period of the first switch S1 is the switching-off period of the second switch S2, and the switching-off period of the first switch S1 is the switching-on period of the second switch S2. The third operation and the fourth operation may form a set, which may be repeated a predetermined number of times.

Figure 7:
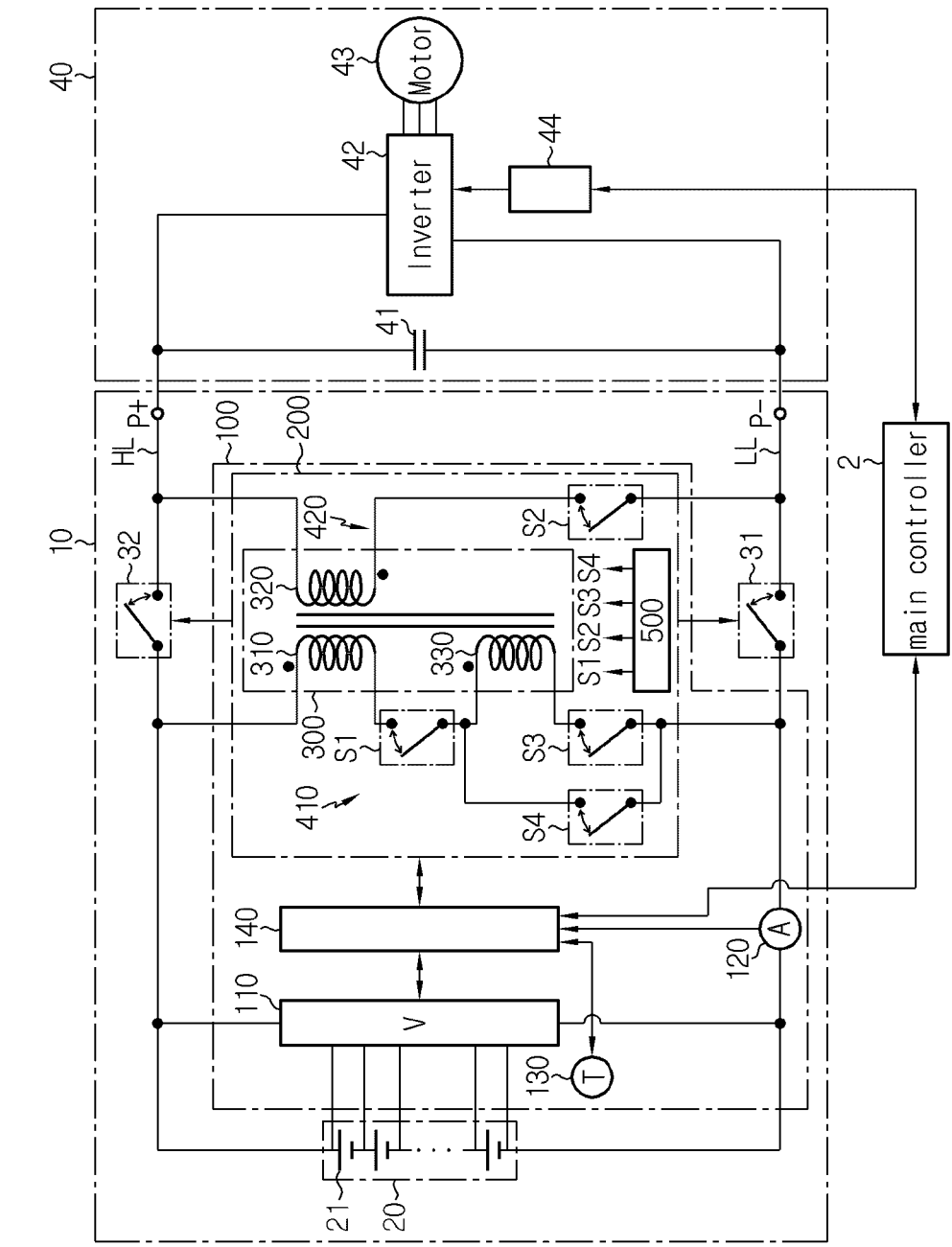
FIG. 7 is a diagram exemplarily showing the configuration of a power supply circuit according to another embodiment of the present disclosure.
Figure 8:
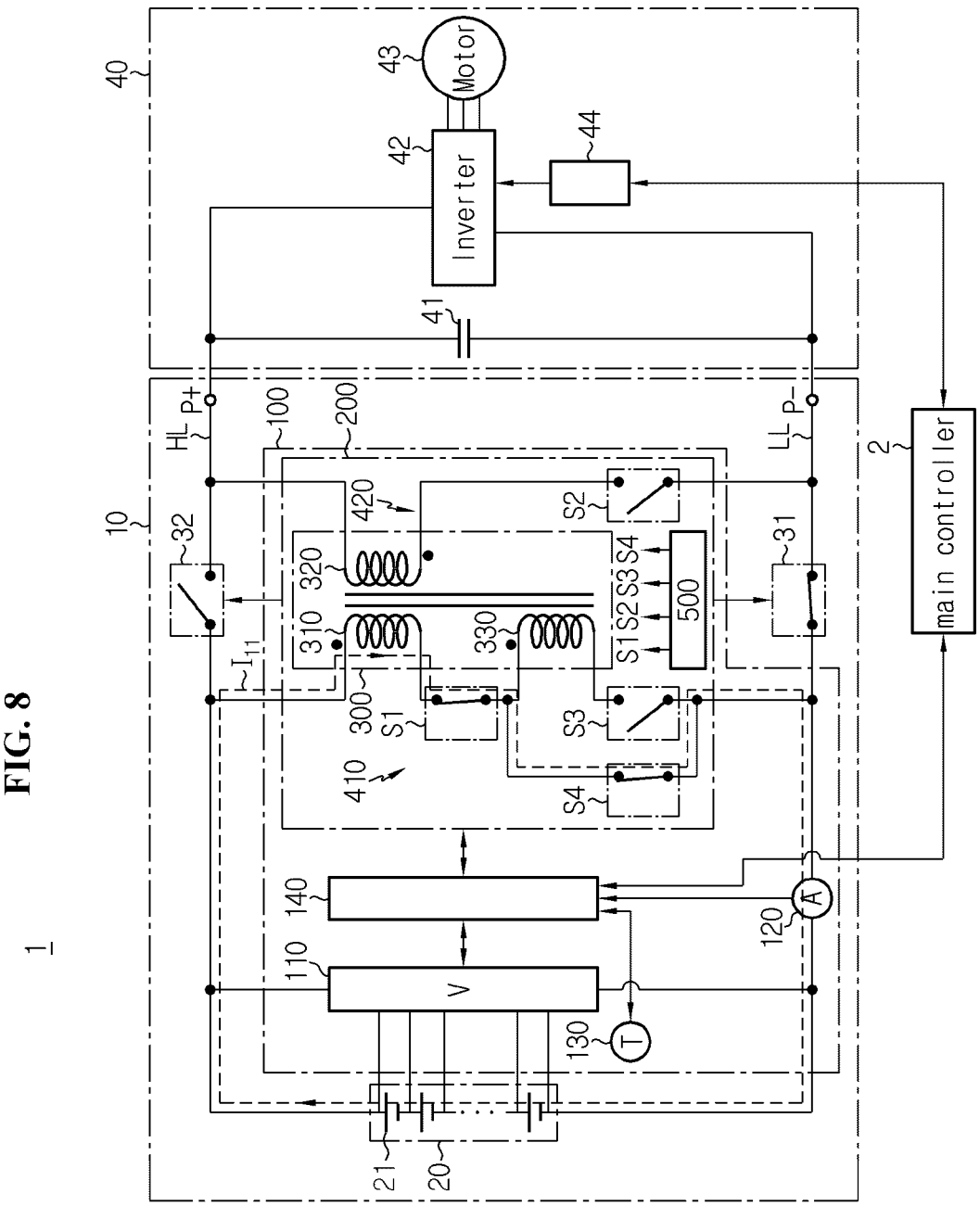
FIGS. 8 and 9 are diagrams for reference in describing a first operation and a second operation related to a first control mode in which the power supply circuit of FIG. 7 pre-charges a smoothing capacitor.
Figure 9:
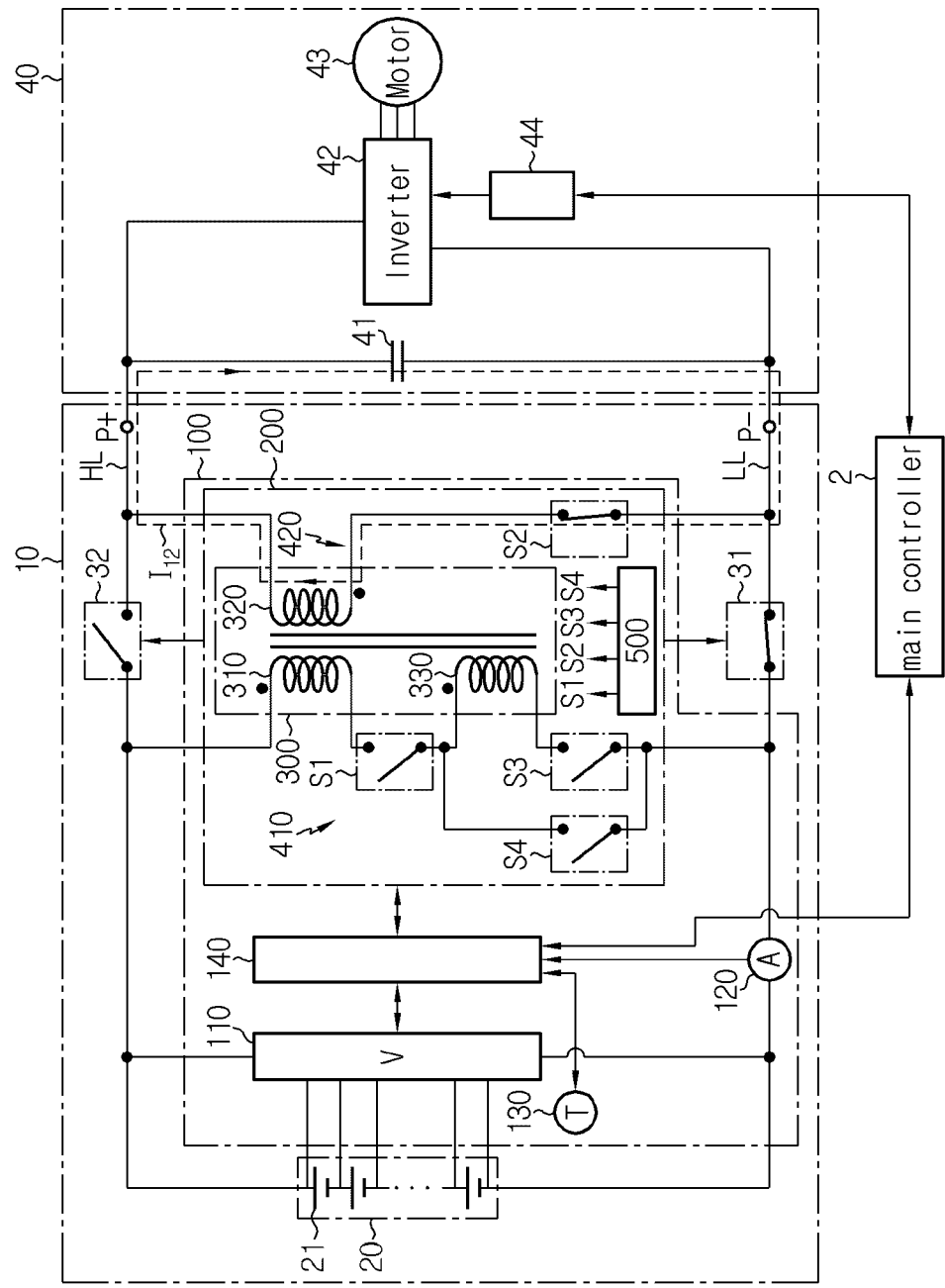
Figure 10:
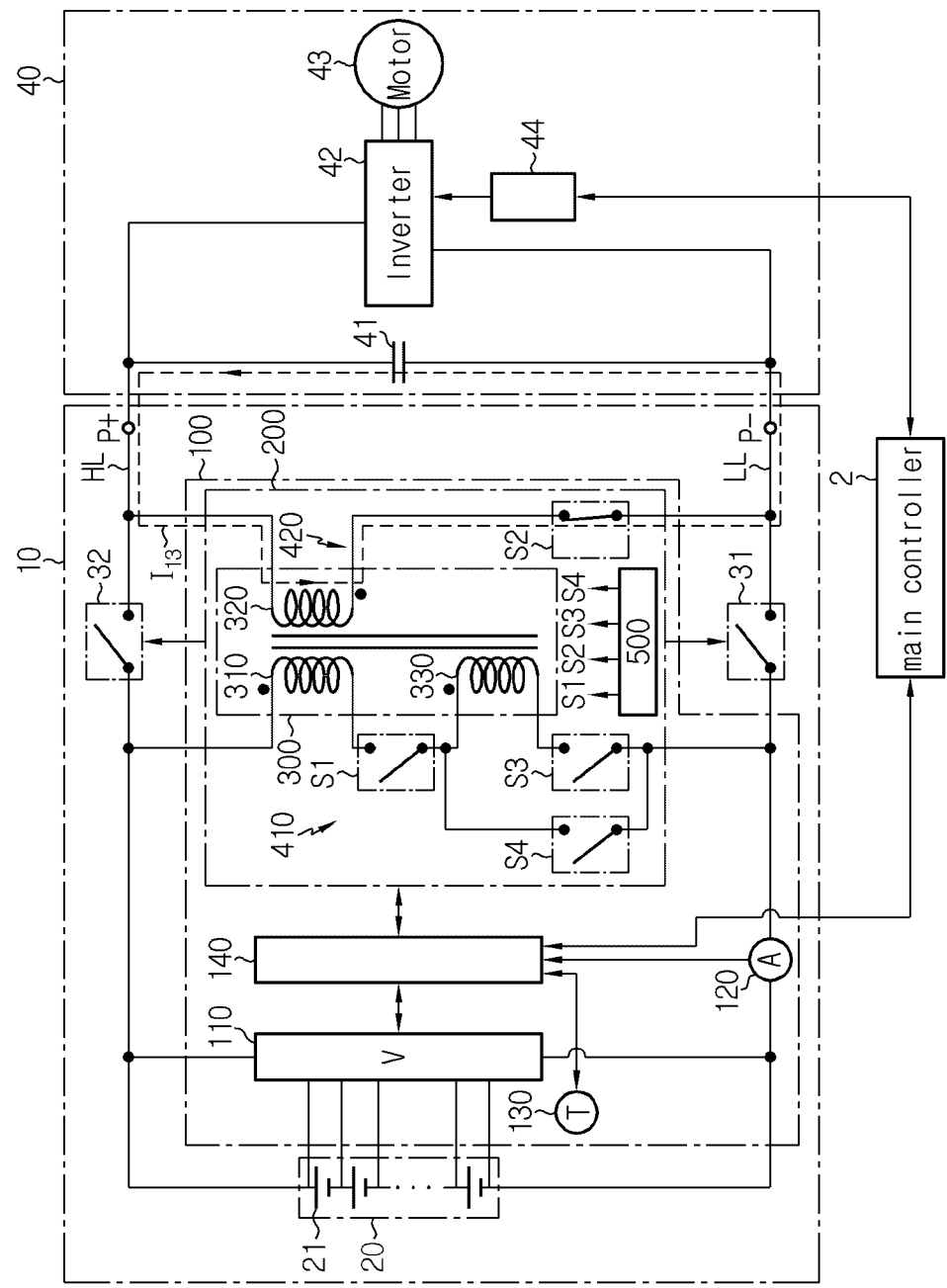
FIGS. 10 and 11 are diagrams for reference in describing a third operation and a fourth operation related to a second control mode in which the power supply circuit of FIG. 7 charges a battery.
Figure 11:
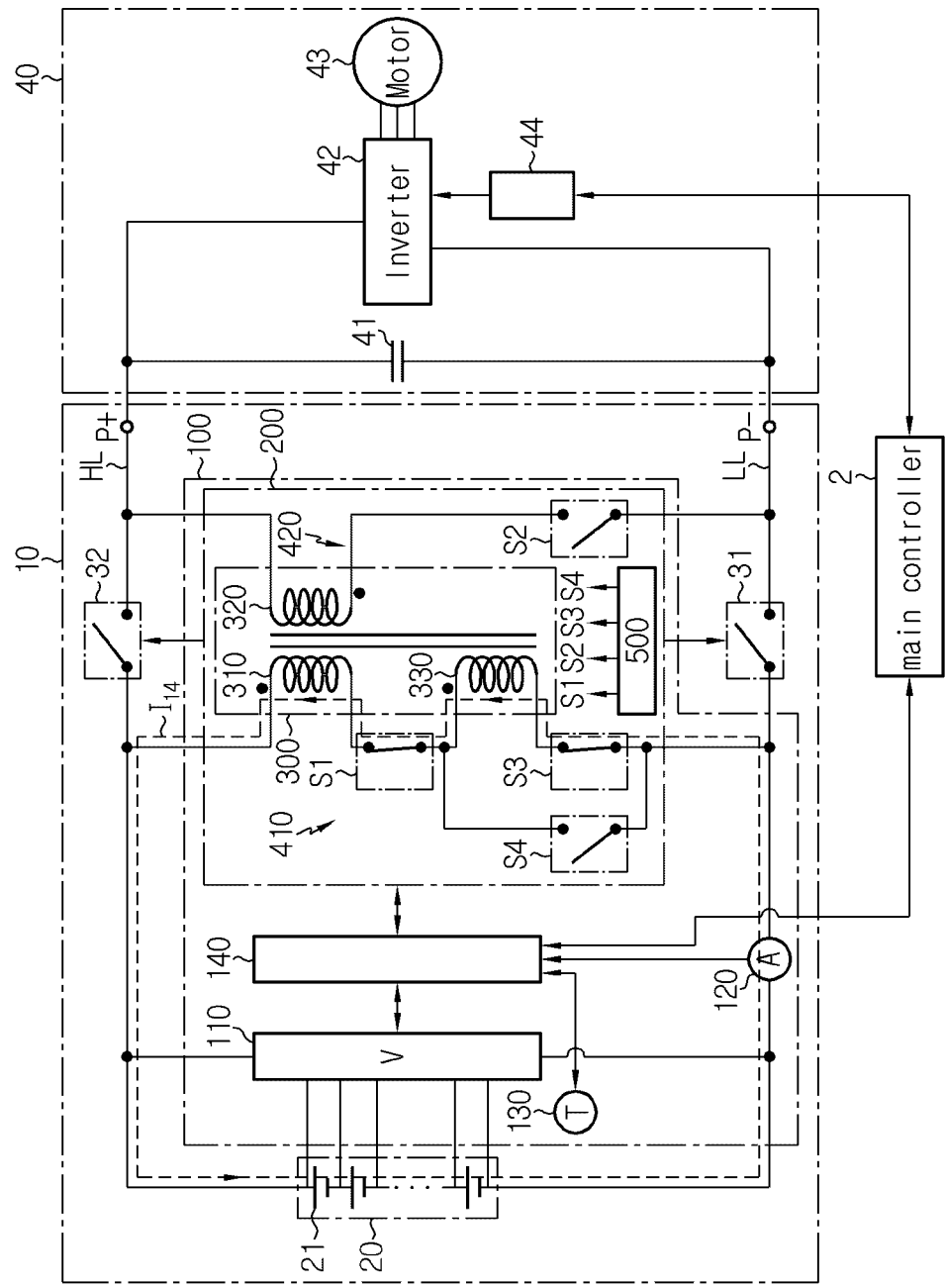

FIG. 7 is a diagram exemplarily showing the configuration of a power supply circuit according to another embodiment of the present disclosure, FIGS. 8 and 9 are diagrams for reference in describing the first operation and the second operation related to the first control mode in which the power supply circuit of FIG. 7 pre-charges the smoothing capacitor 41, and FIGS. 10 and 11 are diagrams for reference in describing the third operation and the fourth operation related to the second control mode in which the power supply circuit of FIG. 7 charges the battery 20.

Referring to FIG. 7, the power supply circuit 200 includes a transformer 300, a first switching circuit 410, a second switching circuit 420 and a switch controller 500.

The transformer 300 includes a first winding 310, a second winding 320 and a third winding 330. The third winding 330 is connected in series to the first winding 310. The second winding 320 is magnetically coupled to the first winding 310 and the third winding 330. When energy is transferred from at least one of the first winding 310 and the third winding 330 to the second winding 320, the first winding 310 and the third winding 330 are a primary winding, and the second winding 320 is a secondary winding. On the contrary, when energy is transferred from the second winding 320 to at least one of the first winding 310 and the third winding 330, the second winding 320 is a primary winding, and the first winding 310 and the third winding 330 are a secondary winding. The number of turns of the first winding 310 may be a, and the number of turns of the second winding 320 may be b. In this case, a:b=1:$N_1$, where $N_1$ may be larger than 0 and equal to or less than 1 (for example, 0.98). The number of turns of the third winding 330 may be c. In this case, c:b=1:$N_2$, where $N_2$ may be larger than 0 and equal to or less than 1.

The first switching circuit 410 includes a first switch S1, a third switch S3 and a fourth switch S4. The first switch S1 is connected in series to the first winding 310. The third switch S3 is connected in series to the third winding 330. The fourth switch S4 is connected in parallel to the third winding 330 and the third switch S3. The first switching circuit 410 is connected in parallel to the battery 20.

The second switching circuit 420 includes a second switch S2. The second switch S2 is connected in series to the second winding 320. The second switching circuit 420 is connected in parallel to the smoothing capacitor 41. That is, the second switch S2 is connected in parallel to the smoothing capacitor 41 together with the second winding 320. When the second switch S2 is turned on, energy stored in the second winding 320 is transferred to the smoothing capacitor 41, or energy stored in the smoothing capacitor 41 is transferred to the second winding 320.

<First Control Mode>

In the first control mode, the switch controller 500 performs a first operation and a second operation in a sequential order. Referring to FIG. 8, the first operation is an operation of turning on the first switch S1 and the fourth switch S4 and turning off the second switch S2 and the third switch S3. When the first switch S1 and the fourth switch S4 are turned on, energy of the battery 20 is transferred to the first winding 310 while the discharge current $I_{11}$ from the battery 20 flows through the first switch S1, the fourth switch S4 and the first winding 310. Accordingly, energy is accumulated in the first winding 310 from the start of the first operation until the second operation starts.

Referring to FIG. 9, the second operation is an operation of turning off the first switch S1, the third switch S3 and the fourth switch S4 and turning on the second switch S2. When the first switch S1, the third switch S3 and the fourth switch S4 are turned off and the second switch S2 is turned on, energy accumulated in the first winding 310 is transferred to the second winding 320 which is magnetically coupled to the first winding 310. Accordingly, the smoothing capacitor 41 is pre-charged while the current $I_{12}$ flows through the second switch S2, the second winding 320 and the smoothing capacitor 41.

Similar to the first switch S1, the third switch S3 and the fourth switch S4 may be a field effect transistor that is turned on when a pulse signal has the high state (for example, 3V) and turned off when the pulse signal has the low state (for example, 0V).

In the first control mode, the switch controller 500 may implement the first operation and the second operation by outputting a first pulse signal of a predetermined duty ratio to the first switch S1 and the fourth switch S4 and a second pulse signal having the opposite phase to the phase of the first pulse signal to the second switch S2. In the first control mode, the third switch S3 may be maintained in the turn-off state. In the first control mode, the switching-on period of the first switch S1 and the fourth switch S4 becomes the switching-off period of the second switch S2, and the switching-off period of the first switch S1 and the fourth switch S4 becomes the switching-on period of the second switch S2. The first operation and the second operation may form a set, and they may be repeated a predetermined number of times.

<Second Control Mode>

In the second control mode, the switch controller 500 performs a third operation and a fourth operation in a sequential order. Referring to FIG. 10, the third operation is an operation of turning off the first switch S1, the third switch S3 and the fourth switch S4, and turning on the second switch S2. When the second switch S2 is turned on, energy of the smoothing capacitor 41 is transferred to the second winding 320 while the discharge current $I_{13}$ from the smoothing capacitor 41 flows through the second switch S2 and the second winding 320. Accordingly, energy is accumulated in the second winding 320 from the start of the third operation until the fourth operation starts.

Referring to FIG. 11, the fourth operation is an operation of turning off the second switch S2 and the fourth switch S4, and turning on the first switch S1 and the third switch S3. When the second switch S2 and the fourth switch S4 are turned off and the first switch S1 and the third switch S3 are turned on, energy accumulated in the second winding 320 is transferred to the first winding 310 and the third winding 330 which is magnetically coupled to the second winding 320. Accordingly, the battery 20 is charged while the gradually decreasing current I14 flows through the first switch S1, the third switch S3, the first winding 310, and the third winding 330 and the battery 20.

In the second control mode, the switch controller 500 may implement the third operation and the fourth operation by outputting a third pulse signal of a predetermined duty ratio to the first switch S1 and the third switch S3 and a fourth pulse signal having the opposite phase to the phase of the third pulse signal to the second switch S2. In the second control mode, the fourth switch S4 may be maintained in the turn-off state. In the second control mode, the switching-on period of the first switch S1 and the third switch S3 is the switching-off period of the second switch S2, and the switching-off period of the first switch S1 and the third switch S3 is the switching-on period of the second switch S2. The third operation and the fourth operation may form a set, which may be repeated a predetermined number of times.

Figure 12:
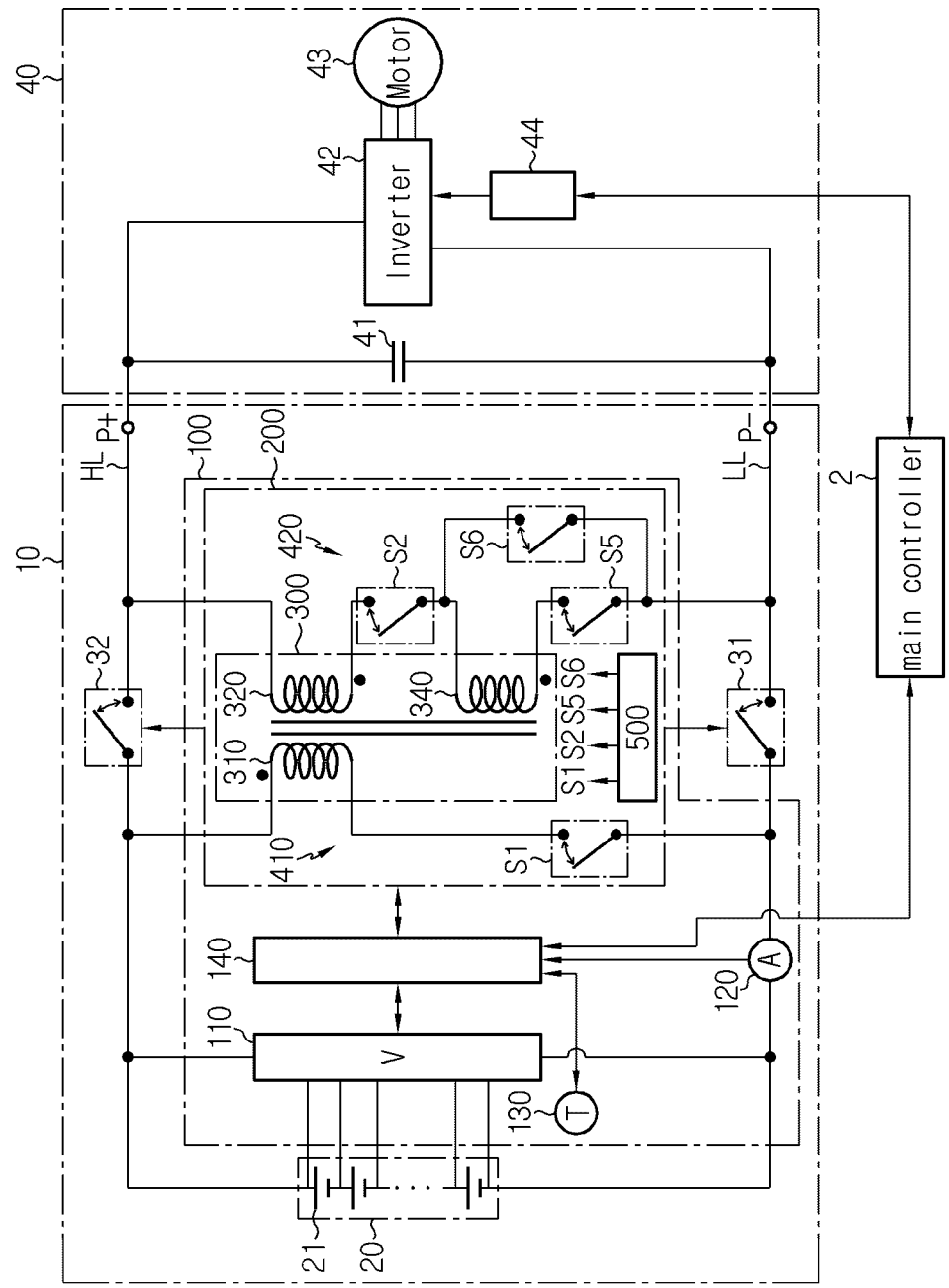
FIG. 12 is a diagram exemplarily showing the configuration of a power supply circuit according to still another embodiment of the present disclosure.
Figure 13:
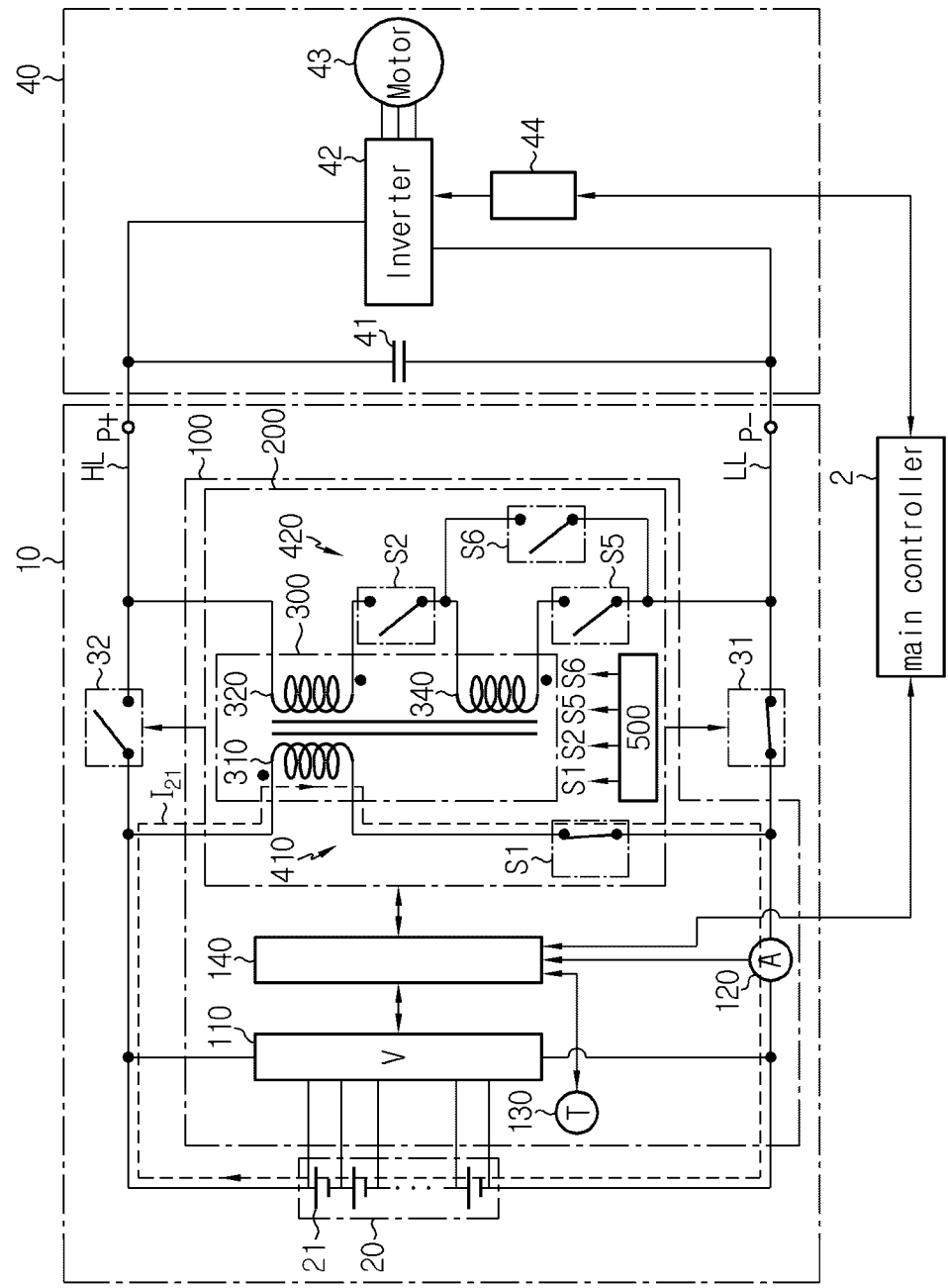
FIGS. 13 and 14 are diagrams for reference in describing a first operation and a second operation related to a first control mode in which the power supply circuit of FIG. 12 pre-charges a smoothing capacitor.
Figure 14:
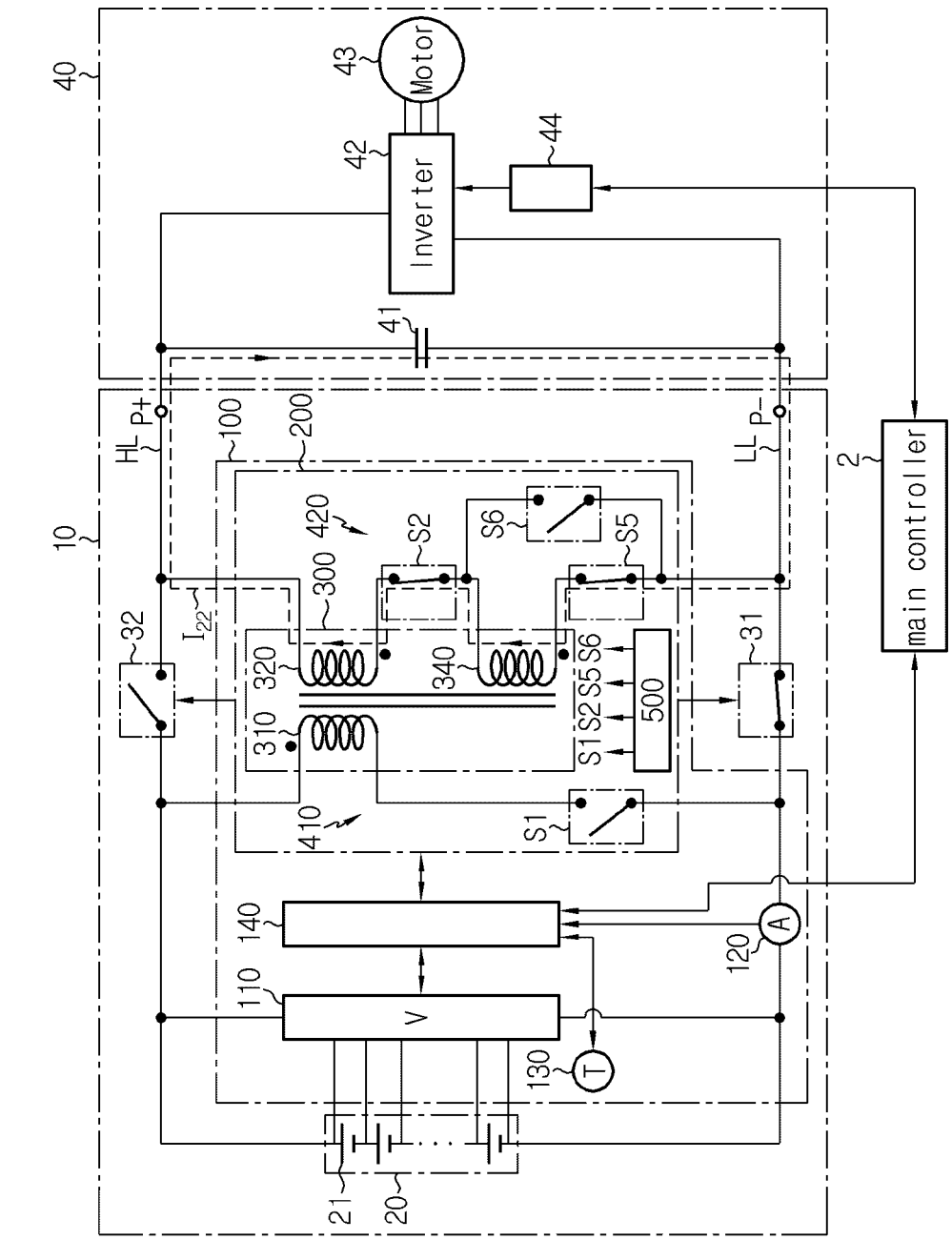
Figure 15:
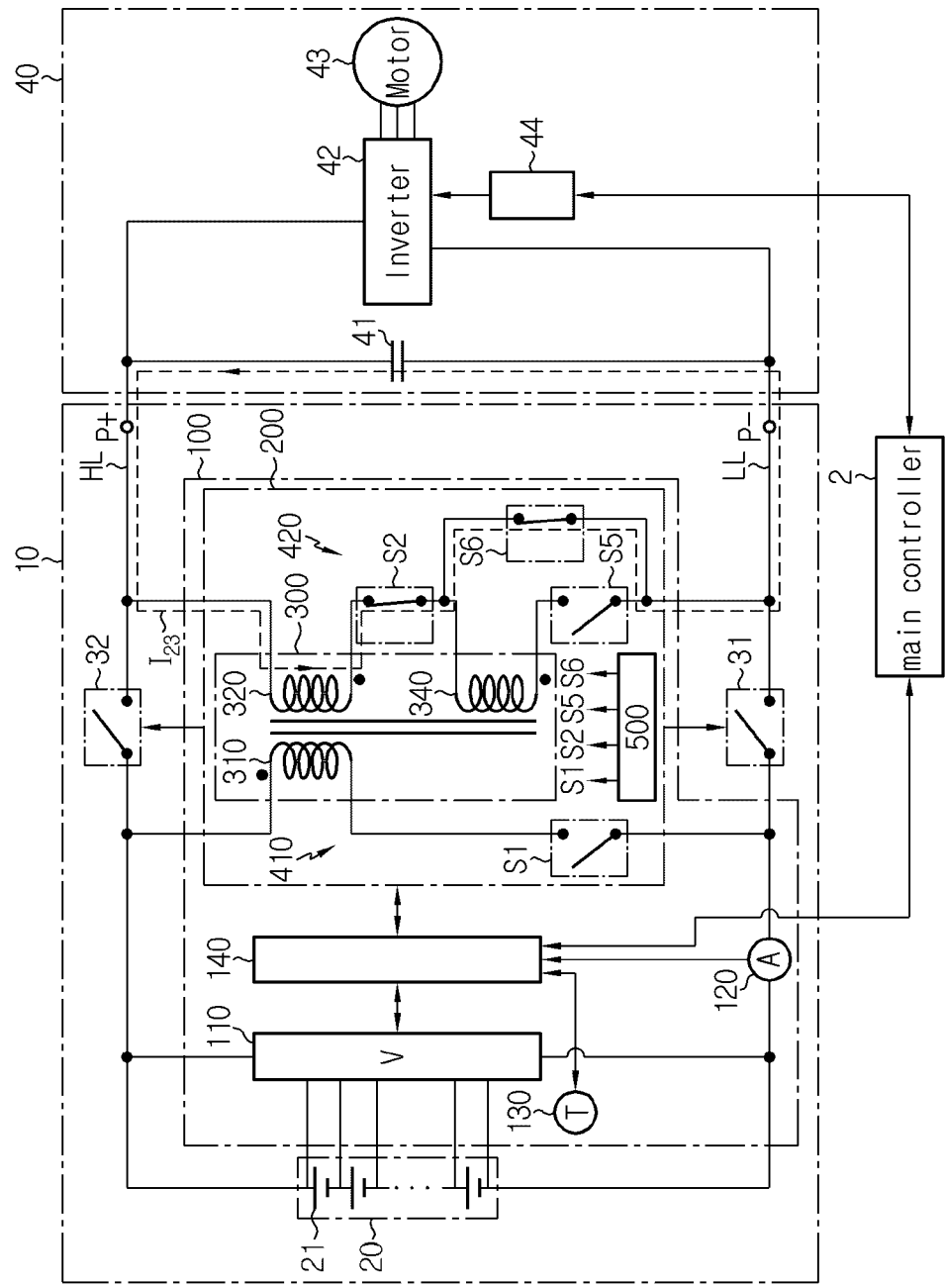
FIGS. 15 and 16 are diagrams for reference in describing a third operation and a fourth operation related to a second control mode in which the power supply circuit of FIG. 12 charges a battery.
Figure 16:
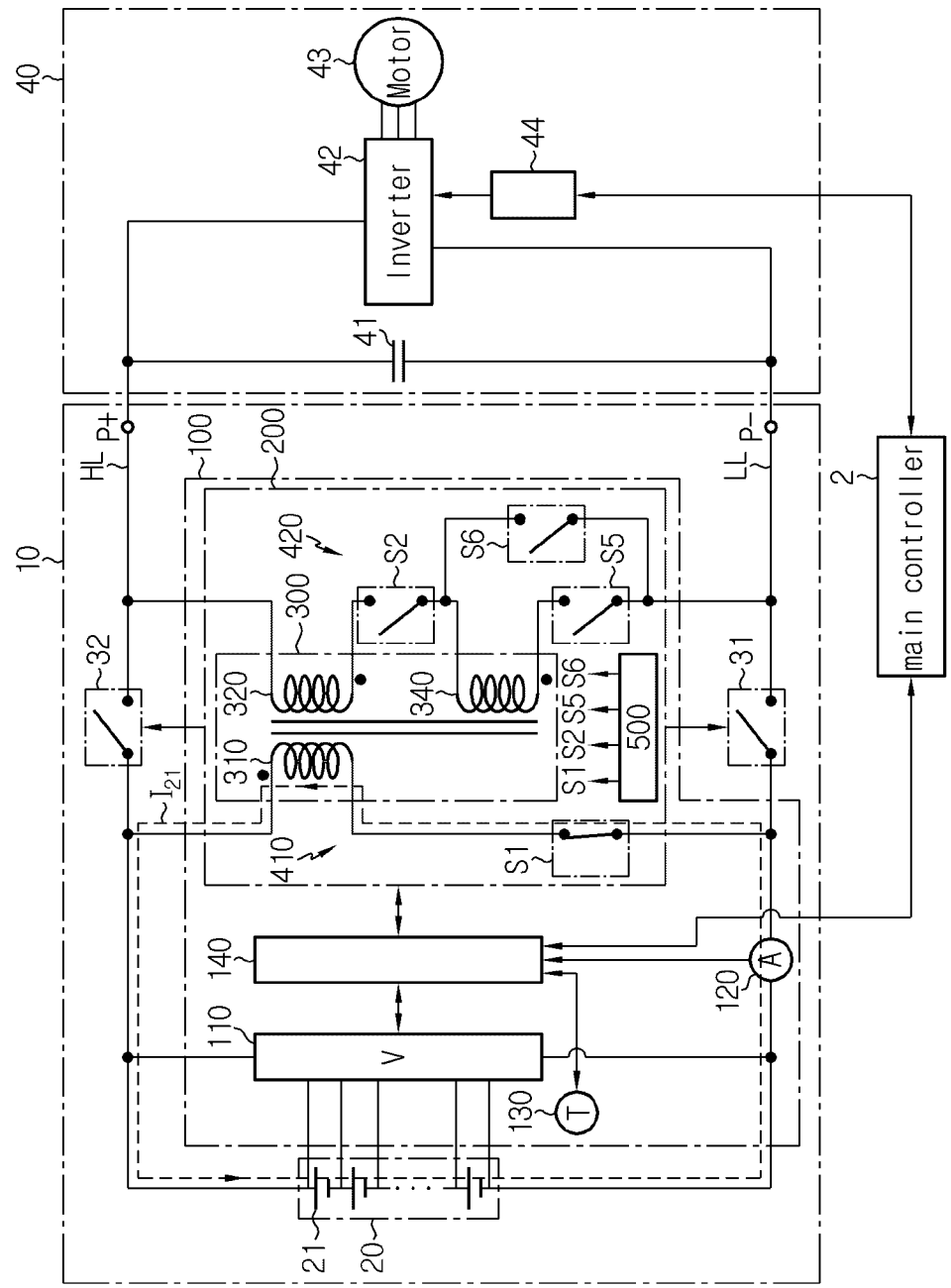

FIG. 12 is a diagram exemplarily showing the configuration of a power supply circuit according to still another embodiment of the present disclosure, FIGS. 13 and 14 are diagrams for reference in describing the first operation and the second operation related to the first control mode in which the power supply circuit of FIG. 12 pre-charges the smoothing capacitor 41, and FIGS. 15 and 16 are diagrams for reference in describing the third operation and the fourth operation related to the second control mode in which the power supply circuit of FIG. 12 charges the battery 20.

Referring to FIG. 12, the power supply circuit 200 includes a transformer 300, a first switching circuit 410, a second switching circuit 420 and a switch controller 500.

The transformer 300 includes a first winding 310, a second winding 320 and a fourth winding 340. The fourth winding 340 is connected in series to the second winding 320. The second winding 320 and the fourth winding 340 are magnetically coupled to the first winding 310. When energy is transferred from the first winding 310 to at least one of the second winding 320 and the fourth winding 340, the first winding 310 is a primary winding, and the second winding 320 and the fourth winding 340 are a secondary winding. On the contrary, when energy is transferred from at least one of the second winding 320 and the fourth winding 340 to the first winding 310, the second winding 320 and the fourth winding 340 are a primary winding, and the first winding 310 is a secondary winding. The number of turns of the first winding 310 is a, the number of turns of the second winding 320 is b, and the number of turns of the fourth winding 340 is d. In this case, $a:(b+d)=1:N_3$, where $N_3$ may be larger than 0 and equal to or less than 1.

The first switching circuit 410 includes a first switch S1. The first switch S1 is connected in series to the first winding 310. The first switching circuit 410 is connected in parallel to the battery 20. That is, the first switch S1 is connected in parallel to the battery 20 together with the first winding 310. When the first switch S1 is turned on, energy stored in the battery 20 is transferred to the first winding 310, or energy stored in the first winding 310 is transferred to the battery 20.

The second switching circuit 420 includes a second switch S2, a fifth switch S5 and a sixth switch S6. The second switch S2 is connected in series to the second winding 320. The fifth switch S5 is connected in series to the fourth winding 340. The sixth switch S6 is connected in parallel to the fourth winding 340 and the fifth switch S5. The second switching circuit 420 is connected in parallel to the smoothing capacitor 41. That is, the second switch S2, the fifth switch S5 and the sixth switch S6 are connected in parallel to the smoothing capacitor 41 together with the second winding 320.

<First Control Mode>

In the first control mode, the switch controller 500 performs a first operation and a second operation in a sequential order. Referring to FIG. 13, the first operation is an operation of turning on the first switch S1, and turning off the second switch S2, the fifth switch S5 and the sixth switch S6. When the first switch S1 is turned on, energy of the battery 20 is transferred to the first winding 310 while the discharge current $I_{21}$ from the battery 20 flows through the first switch S1 and the first winding 310. Accordingly, energy is accumulated in the first winding 310 from the start of the first operation until the second operation starts.

Referring to FIG. 14, the second operation is an operation of turning off the first switch S1 and the sixth switch S6 and turning on the second switch S2 and the fifth switch S5. When the first switch S1 and the sixth switch S6 are turned off and the second switch S2 and the fifth switch S5 are turned on, energy accumulated in the first winding 310 is transferred to the second winding 320 and the fourth winding 340 which is magnetically coupled to the first winding 310. Accordingly, the smoothing capacitor 41 is pre-charged while the current 122 flows through the second switch S2, the fifth switch S5, the second winding 320, the fourth winding 340 and the smoothing capacitor 41.

In the same way as the first switch S1, the fifth switch S5 and the sixth switch S6 may be a field effect transistor that is turned on when a pulse signal has the high state (for example, 3V) and is turned off when the pulse signal has the low state (for example, 0V). In the first control mode, the switch controller 500 may implement the first operation and the second operation by outputting a first pulse signal of a predetermined duty ratio to the first switch S1 and a second pulse signal having the opposite phase to the phase of the first pulse signal to the second switch S2 and the fifth switch S5. In the first control mode, the sixth switch S6 may be maintained in the turn-off state. In the first control mode, the switching-on period of the first switch S1 is the switching-off period of the second switch S2 and the fifth switch S5, and the switching-off period of the first switch S1 is the switching-on period of the second switch S2 and the fifth switch S5. The first operation and the second operation may form a set, which may be repeated a predetermined number of times.

<Second Control Mode>

In the second control mode, the switch controller 500 may perform a third operation and a fourth operation in a sequential order. Referring to FIG. 15, the third operation is an operation of turning off the first switch S1 and the fifth switch S5, and turning on the second switch S2 and the sixth switch S6. When the second switch S2 and the sixth switch S6 are turned on, energy of the smoothing capacitor 41 is transferred to the second winding 320 while the discharge current 123 from the smoothing capacitor 41 flows through the second switch S2, the sixth switch S6 and the second winding 320. Accordingly, energy is accumulated in the second winding 320 from the start of the third operation until the fourth operation starts.

Referring to FIG. 16, the fourth operation is an operation of turning off the second switch S2, the fifth switch S5 and the sixth switch S6 and turning on the first switch S1. When the second switch S2, the fifth switch S5 and the sixth switch S6 are turned off and the first switch S1 is turned on, energy accumulated in the second winding 320 is transferred to the first winding 310 magnetically coupled to the second winding 320. Accordingly, the battery 20 is charged while the current 124 flows through the first switch S1, the first winding 310 and the battery 20.

In the second control mode, the switch controller 500 may implement the third operation and the fourth operation by outputting a third pulse signal of a predetermined duty ratio to the first switch S1, and a fourth pulse signal having the opposite phase to the phase of the third pulse signal to the second switch S2 and the sixth switch S6. In the second control mode, the fifth switch S5 may be maintained in the turn-off state. In the second control mode, the switching-on period of the first switch S1 is the switching-off period of the second switch S2 and the sixth switch S6, and the switching-off period of the first switch S1 is the switching-on period of the second switch S2 and the sixth switch S6. The third operation and the fourth operation may form a set, which may be repeated a predetermined number of times.

The control unit 140 may replace the functions of switch controller 500 described above with reference to FIGS. 2 to 16, and in this case, the power supply circuit 200 may include the control unit 140 in place of the switch controller 500.

In the first control mode and the second control mode, the control unit 140 may estimate the state of charge of the battery 20 based on the current measured by a current sensor 120. Accordingly, even though the current does not flow through the pack terminals P+, P−, it is possible to estimate the state of charge of the battery 20 that changes by the current $I_1, I_2, I_3, I_4, I_{11}, I_{12}, I_{13}, I_{14}, I_{21}, I_{22}, I_{23}, I_{24}$ flowing through the battery 20 while energy is transferred from one of the battery 20 and the smoothing capacitor 41 to the other.

The embodiments of the present disclosure described hereinabove are not implemented only through the apparatus and method, and may be implemented through programs that perform functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

DESCRIPTION OF REFERENCE NUMERALS

1: Electrical apparatus
10: Battery pack
20: Battery
31: First main contactor
32: Second main contactor
40: Electrical load
100: Battery management system
200: Power supply circuit
300: Transformer
410: First switching circuit
420: Second switching circuit
500: Switch controller

What is claimed is:

1. A power supply circuit for energy transfer between a battery and a smoothing capacitor, the power supply circuit comprising:
a transformer including a first winding and a second winding magnetically coupled to the first winding, the first winding being parallel to the battery and the second winding being parallel to the smoothing capacitor;
a first switching circuit including a first switch connected in series to the first winding, wherein the first switching circuit is connected in parallel to the battery together with the first winding;
a second switching circuit including a second switch connected in series to the second winding, wherein the second switching circuit is connected in parallel to the smoothing capacitor together with the second winding; and
a switch controller configured to independently control each switch included in the first switching circuit and the second switching circuit,
wherein the switch controller is configured to perform, in a first control mode for pre-charging the smoothing capacitor using energy of the battery, a first operation of turning on the first switch and turning off the second switch, and subsequently perform a second operation of turning off the first switch and turning on the second switch, and
wherein the switch controller is configured to perform, in a second control mode for charging the battery using energy of the smoothing capacitor, a third operation of turning off the first switch and turning on the second switch, and subsequently perform a fourth operation of turning on the first switch and turning off the second switch.

2. The power supply circuit according to claim 1, wherein a ratio of the number of turns of the second winding to the number of turns of the first winding is larger than 0 and equal to or less than 1.

3. The power supply circuit according to claim 1, wherein the transformer further includes a third winding magnetically coupled to the second winding,
wherein the third winding is connected in series to the first winding, and
wherein the first switching circuit further includes:
a third switch connected in series to the third winding; and
a fourth switch connected in parallel to the third winding and the third switch.

4. The power supply circuit according to claim 3, wherein a ratio of the number of turns of the second winding to the number of turns of the third winding is larger than 0 and equal to or less than 1.

5. The power supply circuit according to claim 3, wherein the switch controller is configured to:
turn off the third switch and turn on the fourth switch while performing the first operation, and
turn off the third switch and turn off the fourth switch while performing the second operation.

6. The power supply circuit according to claim 3, wherein the switch controller is configured to:
turn off the third switch and turn off the fourth switch while performing the third operation, and
turn on the third switch and turn off the fourth switch while performing the fourth operation.

7. The power supply circuit according to claim 1, wherein the transformer further includes a fourth winding magnetically coupled to the first winding,
wherein the fourth winding is connected in series to the second winding, and
wherein the second switching circuit further includes:
a fifth switch connected in series to the fourth winding; and
a sixth switch connected in parallel to the fourth winding and the fifth switch.

8. The power supply circuit according to claim 7, wherein the switch controller is configured to:

turn off the fifth switch and turn off the sixth switch while performing the first operation, and turn on the fifth switch and turn off the sixth switch while performing the second operation.

9. The power supply circuit according to claim 7, wherein the switch controller is configured to:

turn off the fifth switch and turn on the sixth switch while performing the third operation, and turn off the fifth switch and turn off the sixth switch while performing the fourth operation.

10. The power supply circuit according to claim 1, wherein each switch included in the first switching circuit and the second switching circuit is a field effect transistor.

11. A battery management system comprising the power supply circuit according to claim 1.

12. A battery pack comprising the battery management system according to claim 11.

13. The power supply circuit according to claim 1, wherein the battery is charged by the energy of a current flowing through the first winding and the first switch.

* * * * *